(12) United States Patent
Cahill

(10) Patent No.: US 9,143,229 B1
(45) Date of Patent: Sep. 22, 2015

(54) METHOD AND APPARATUS FOR ESTIMATING OPTICAL POWER

(75) Inventor: Michael Cahill, Dedham, MA (US)

(73) Assignee: II-VI Photonics, (US) Inc., Woburn, MA (US)

(*) Notice: Subject to any disclaimer, the term of this patent is extended or adjusted under 35 U.S.C. 154(b) by 326 days.

(21) Appl. No.: 12/902,032

(22) Filed: Oct. 11, 2010

Related U.S. Application Data

(60) Provisional application No. 61/250,766, filed on Oct. 12, 2009.

(51) Int. Cl.
*H04B 10/079* (2013.01)

(52) U.S. Cl.
CPC .................................. *H04B 10/079* (2013.01)

(58) Field of Classification Search
CPC .................. H04B 10/079; H04B 10/07955
USPC ....................................................... 398/25, 34
See application file for complete search history.

(56) References Cited

U.S. PATENT DOCUMENTS

| | | | |
|---|---|---|---|
| 7,002,697 B2 * | 2/2006 | Domash et al. | 356/519 |
| 2002/0063923 A1 * | 5/2002 | Coppeta et al. | 359/124 |
| 2005/0053328 A1 * | 3/2005 | Doerr | 385/27 |
| 2005/0271386 A1 * | 12/2005 | Zeng et al. | 398/85 |
| 2005/0276601 A1 * | 12/2005 | Morawski et al. | 398/42 |
| 2007/0071441 A1 * | 3/2007 | Marom | 398/25 |
| 2007/0109550 A1 * | 5/2007 | Ja et al. | 356/480 |
| 2007/0264010 A1 * | 11/2007 | Bartolini | 398/9 |

OTHER PUBLICATIONS

Chia-Yin Che; Evans, R.J.; Tucker, R.J.; , "Signal Processing for Optical Power Spectrum Monitoring," Signals, Systems and Computers, 2006. ACSSC '06. Fortieth Asilomar Conference on , vol., no., pp. 559-563, Oct. 29-Nov. 1, 2006 doi: 10.1109/ACSSC.2006.354810.*
S. Paes et al., "Advantages of adaptive speckle filtering prior to application of iterative deconvolution methods for optical coherent tomography imaging", Optical and Quantum Electronics, Springer, 2005.*
Che et al., "Signal Processing for Optical Power Spectrum Monitoring", ACSSC '06, 2006.*
Jansson, Peter A., Deconvolution With Applications in Spectroscopy, 1984, pp. 69-77, Academic Press, Inc.

* cited by examiner

*Primary Examiner* — Shi K Li
(74) *Attorney, Agent, or Firm* — Kurt Rauschenbach; Rauschenbach Patent Law Group, LLC

(57) ABSTRACT

A method of monitoring optical power in an optical channel includes directing a portion of a broadband optical signal propagating through an optical channel to an optical input of an electrically controllable tunable optical filter. The portion of the broadband optical signal is filtered with the electrically controllable tunable filter to select an optical channel for optical power monitoring. The selected optical channel is detected and an electrical signal that represents the selected optical channel is generated. An optical power of the selected optical channel is estimated from the electrical signal that represents the selected optical channel by performing an iterative deconvolution of the selected optical channel signal with a predetermined response function of the electrically controllable tunable optical filter.

23 Claims, 8 Drawing Sheets

METHOD AND APPARATUS FOR ESTIMATING OPTICAL POWER

RELATED APPLICATION SECTION

This application claims priority to U.S. Provisional Patent Application Ser. No. 61/250,766, filed Oct. 12, 2009, and entitled "Method and Apparatus for Estimating Optical Power." The entire application of U.S. Provisional Patent Application Ser. No. 61/250,766 is incorporated herein by reference.

The section headings used herein are for organizational purposes only and should not be construed as limiting the subject matter described in the present application.

BACKGROUND OF THE TEACHING

Optical fiber communication systems are now widely deployed. Recently, relatively new communication services, such as the Internet, high-speed data links, video services, wireless services and CATV, have resulted in a dramatic increase in the need for higher information data rates. The aggregate data throughput rate of a communication system can be increased either by increasing the bandwidth of an individual data channel or by increasing the number of data channels.

State-of-the art optical fiber communication systems are being built to transmit data over long distances with higher data rates and/or with a larger number of data channels. In addition, state-of-the art optical fiber communication systems often include features, such as gain management, wavelength multiplexing, tunability, and switching. Furthermore, state-of-the art optical communications systems are agile, flexible, and reconfigurable. Many features of these state-of-the art networks are automated.

These state-of-the art optical communications systems typically require channel monitoring throughout the system. Automation of many actions performed on these systems, such as channel provisioning and power balancing, can only be realized by using data from optical channel monitors (OCMs). Optical channel monitors provide information about the optical transmission system, such as the optical power, number of optical channels, channel identification, wavelength, and in some cases, optical signal-to-noise ratio (OSNR). It is desirable for the optical channel monitor to accurately determine the optical power in broadband optical signals.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DETAILED DESCRIPTION

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Some current state-of-the-art optical channel monitors have limited computing capacity. Therefore, a computationally intensive method of estimating the power of broadband signals is not desirable. In addition, many applications for optical channel monitoring require the use of relatively inexpensive monitors that have relatively wide optical bandwidths. The methods of the present teaching can estimate the optical power of broadband signals and identify optical signals and bit rates with a high accuracy with a few relatively simple measurements using relatively broadband tunable optical filters. These methods are desirable for many applications.

Figure 1:
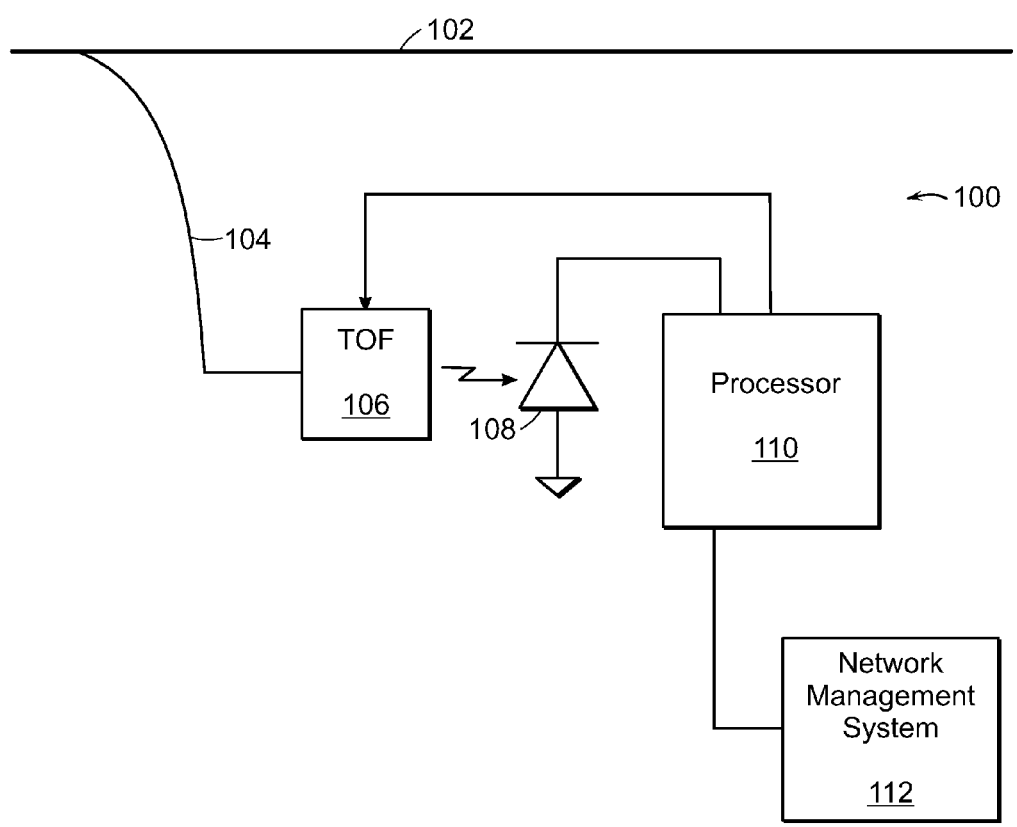
FIG. 1 illustrates a block diagram of an optical channel monitor that estimates power of broadband optical signals according to the present teaching.

FIG. 1 illustrates a block diagram of an optical channel monitor 100 that estimates power of broadband optical signals according to the present teaching. An optical channel 102 propagates broadband optical signals. An input of the optical tap 104 is optically coupled to the optical channel 102. The optical tap 104 directs a portion of the broadband optical signal propagating through the optical channel 102 to the optical channel monitor 100.

An output of the optical tap 104 is optically coupled to an input of a tunable optical filter 106. The tunable optical filter 106 can be any type of tunable optical filter that is electrically controllable. In one embodiment, the tunable optical filter 106 is an electrically controllable thermally tunable optical filter, such as the tunable optical filters that are commercially available from Aegis Lightwave, Inc., which is the assignee of the present application. One skilled in the art will appreciate that many other types of electrically tunable optical filters can be used. The tunable optical filter 106 selects an optical channel for monitoring and provides the selected optical channel to an optical output.

A detector 108 is positioned proximate to the output of the tunable optical filter 106 so that the selected optical channel is received at an input of the detector 108. In one embodiment, the detector 108 is a photodiode. The detector 108 generates a signal at an output that represents the selected optical channel.

The output of the detector 108 is electrically connected to a processor 110. In one embodiment, the processor 110 is a digital signal processor. The output of the processor 110 is electrically connected to a control input of the tunable optical filter 106. The processor 110 also includes a port that is electrically connected to a network management system 112. The processor 110 generates a control signal at the output that controls the passband of the tunable optical filter 106. In addition, the processor 110 receives information from and provides data to the network management system 112.

In operation, a portion of a broadband DWDM optical signal is tapped from the optical channel 102 and directed to the input of the tunable optical filter 106. The tunable optical filter 106 selects an optical channel for monitoring and provides the selected optical channel at an output. The detector 108 receives the selected optical channel and generates an electrical signal at the output which represents the selected optical channel.

The processor 110 receives the electrical signal generated by the detector 108 and then estimates the optical power in the selected optical channel from the portion of the broadband DWDM optical signal tapped from the optical channel 102. In one embodiment, the processor 110 is a digital signal processor that performs an iterative deconvolution algorithm of the peak powers of the selected optical channel signals received from the optical tap 104 with the known response function of the tunable optical filter 106.

The present teaching features a deconvolution algorithm that accurately calculates the full channel power and provides identification of individual signals and bit rates. In particular, the deconvolution algorithm iteratively convolves an estimate of the input spectrum with a tunable optical detector delta response to recreate the tunable optical detector output. The deconvolution algorithm of the present teachings converges quickly to predetermined stability criteria. For example, the deconvolution algorithm can be iterated until a difference between the estimated and the actual channel is on order of <0.05 dB or some other predetermined error. In addition, the deconvolution algorithm of the present teachings is robust and has only minimal sensitivity to artifacts and noise.

Figure 2:
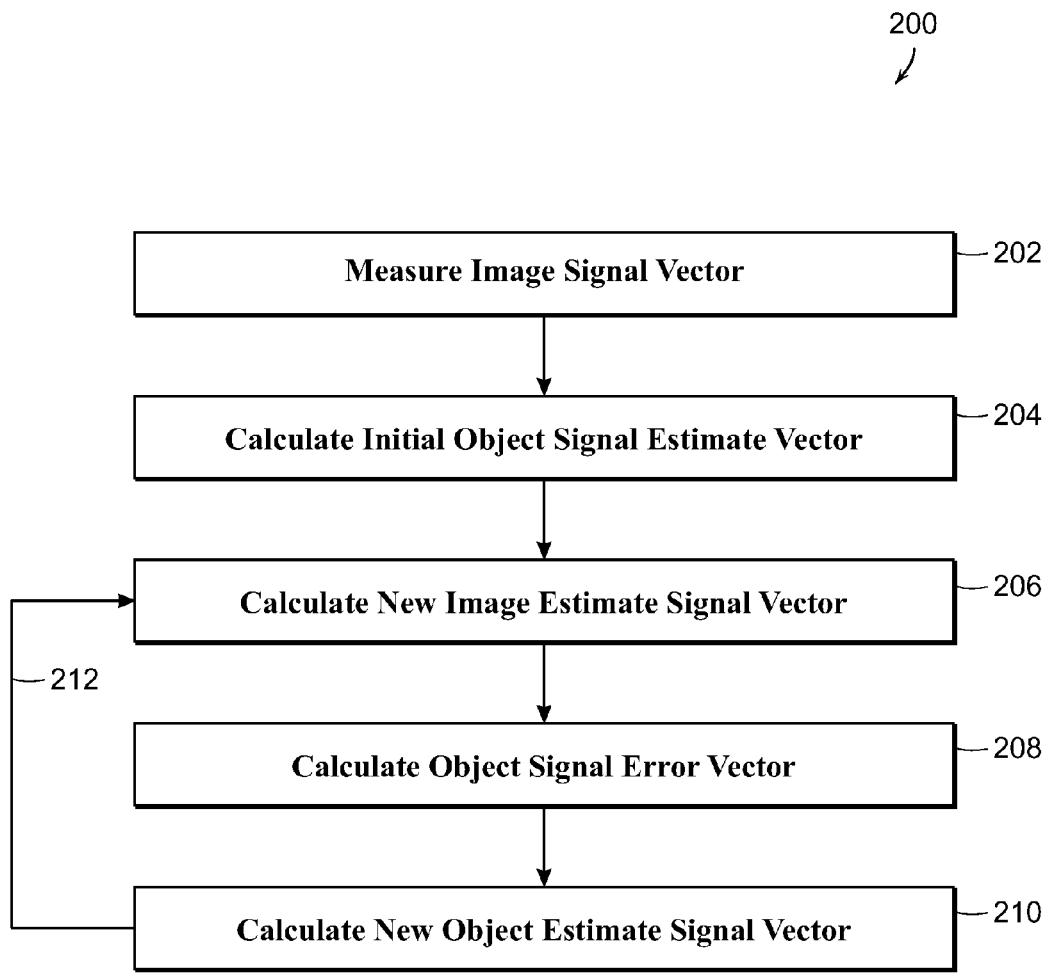
FIG. 2 is a flow chart of a method of deconvolution according to the present teaching that determines full channel power of particular optical channels and that provides identification of individual optical signals.

FIG. 2 is a flow chart of a method of deconvolution 200 according to the present teaching that determines full channel power of particular optical channels and that provides identification of individual signals. The first step 202 in the method of deconvolution 200 is to measure the image signal I, which is the OCM optical filter response to an unknown optical channel signal. This unknown optical channel signal is referred to herein as the object signal.

Figure 3:
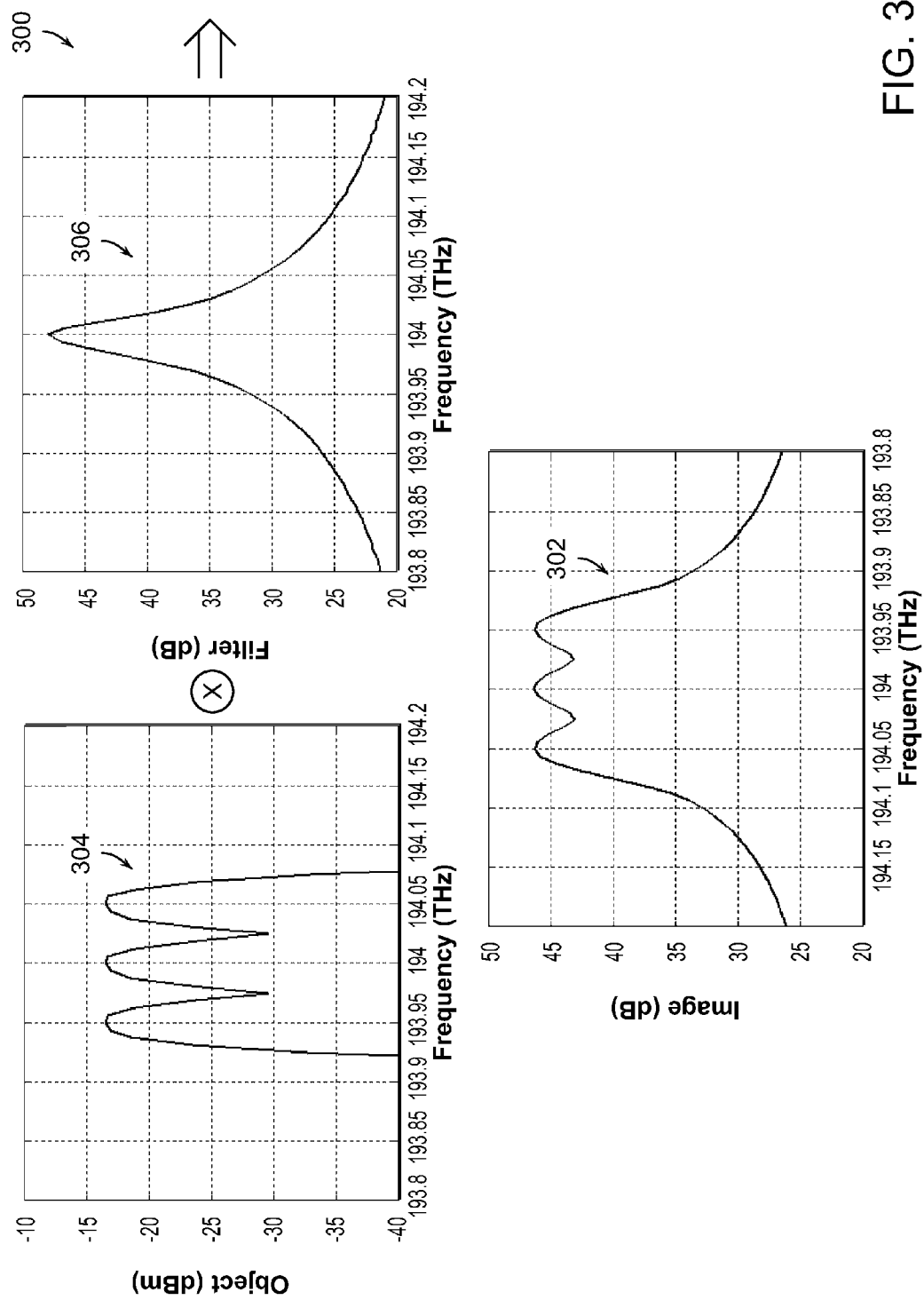
FIG. 3 graphically illustrates how an image signal I is created from an object signal O passing through an optical filter by using a convolution.

FIG. 3 graphically illustrates how the image signal I 302 is created from an object signal O passing through an optical filter by using a convolution 300. Referring to the optical channel monitor shown in FIG. 1 and to the convolution shown in FIG. 3, a measured 40 G DWDM optical signal that is tapped from the optical channel 102, which is referred in this example as the object signal O 304, is convolved with the tunable optical filter 106 response function 306, which is referred to in this example as S. The result of the convolution is the image signal I 302 of the object signal O 304. The tunable optical filter 106 response function S 306 has a known filter response or spreading function that is determined by the manufacturer. Therefore, the equation for the image signal I 302 can be represented as follows.

$$I = O \otimes S.$$

Figure 4:
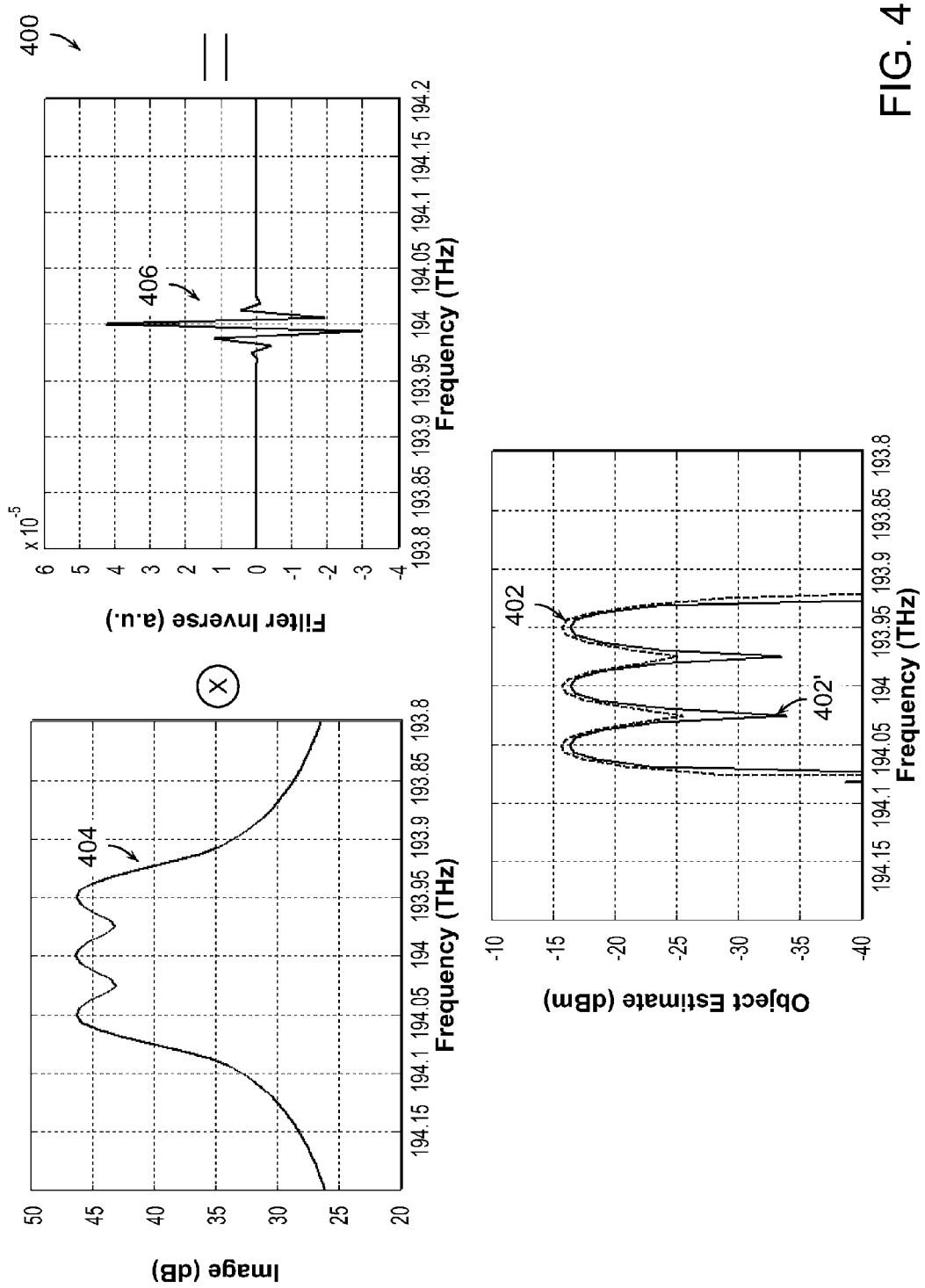
FIG. 4 graphically illustrates a convolution of the image signal I measured by the optical channel monitor and the inverse of the filter response or spreading function $S^{-1}$ that is used to calculate the image signal I of the object signal O.

The second step 204 of the method 200 is to calculate an initial object signal estimate $O_{Est\text{-}initial}$ vector 204, which is a first estimate of the unknown optical channel signal. FIG. 4 graphically illustrates a convolution 400 of the image signal I 404 measured by the optical channel monitor 100 and the inverse of the filter response or spreading function $S^{-1}$ 406 that is used to determine the image signal I 302 of the object signal O 304. The inverse of the filter response or spreading function $S^{-1}$ 406 is calculated from the known filter response S to a predetermined resolution. The initial object signal estimate $O_{Est\text{-}initial}$ 402 is shown in FIG. 4 as a dashed line. The equation 400 for calculating an initial object signal estimate $O_{Est\text{-}initial}$ 402 is as follows:

$$O_{Est\text{-}initial} = I_{Int} \otimes S^{-1}.$$

Figure 5:
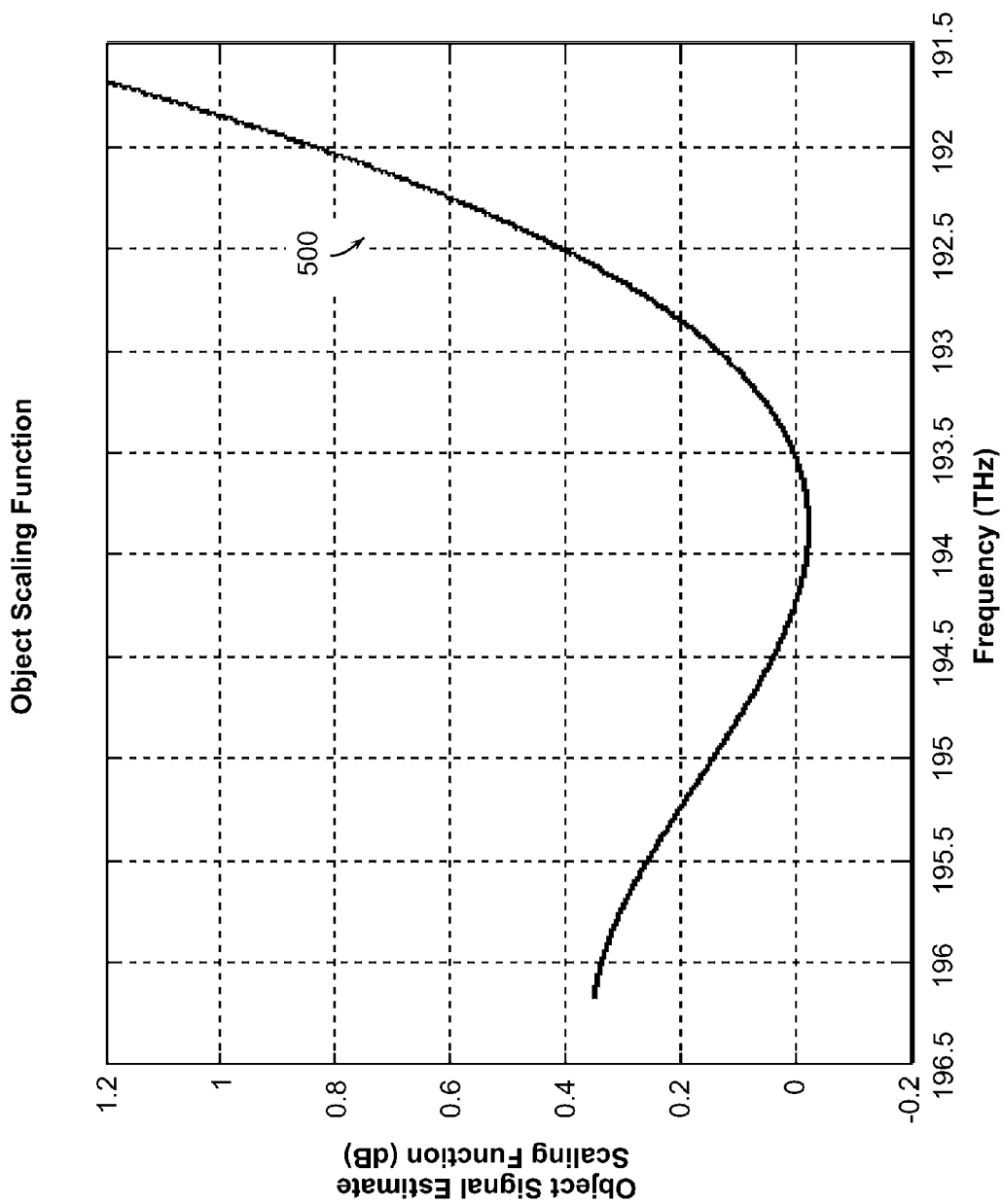
FIG. 5 illustrates a sample object signal estimate $O_{Est}$ scaling function.

In some methods of the present teaching, the object signal estimate $O_{Est}$ is scaled by a scaling function that scales the magnitude of the object signal estimate $O_{Est}$ as a function of frequency to more closely match the actual broadband optical signal propagating through the optical channel 102. FIG. 5 illustrates a sample object signal estimate $O_{Est}$ scaling function 500.

Figure 6:
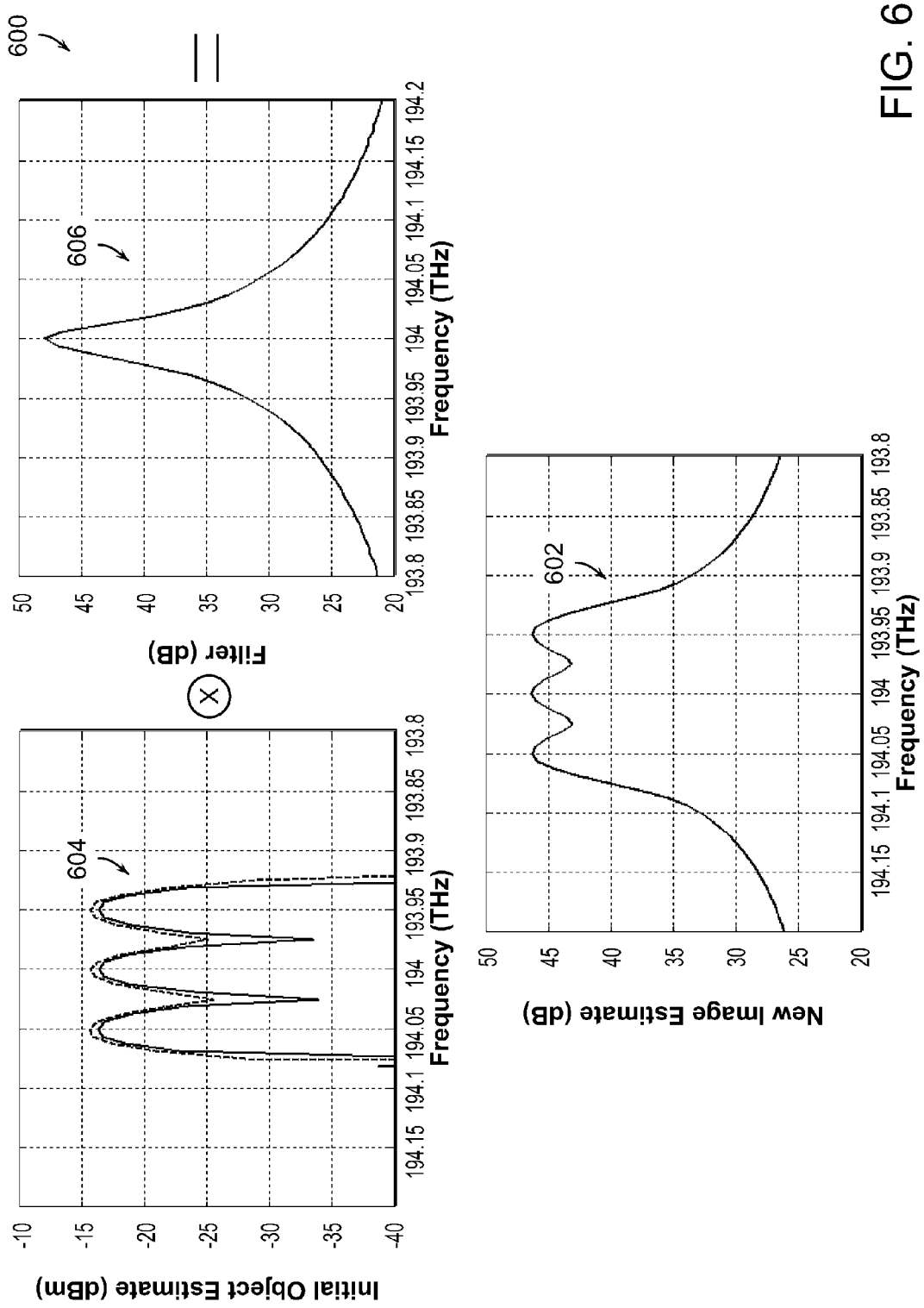
FIG. 6 graphically illustrates a convolution of the initial object signal estimate $O_{Est\text{-}initial}$ and the known filter response or spreading function S that is used to determine the new image estimate signal $I_{Est\text{-}new}$.

The third step 206 of the method 200 is to calculate a new image estimate signal $I_{Est\text{-}new}$ signal vector, which is a more accurate estimate of the unknown optical channel signal. FIG. 6 graphically illustrates a convolution of the initial object signal estimate $O_{Est\text{-}initial}$ 604 and the known filter response or spreading function S 606 that is used to determine the new image estimate signal $I_{Est\text{-}new}$ 602. The initial object signal estimate $O_{Est\text{-}initial}$ 604 was determined from the convolution 400 described in connection with FIG. 4. The equation for calculating the new image estimate signal $I_{Est\text{-}new}$ can be expressed as follows:

$$I_{Est\text{-}new} = O_{Est\text{-}initial} \otimes S.$$

The fourth step 208 of the method 200 is to calculate the object signal error vector $O_{Err}$. The object signal error vector $O_{Err}$ is a scaled difference between the two most recently calculated image signal estimates. In the first iteration of the method 200, the object signal error vector $O_{Err}$ is a scaled difference between the new image estimate signal vector $I_{Est\text{-}new}$ and the image estimate signal vector I (i.e. $I_{Est\text{-}new} - I$). For all other iterations, the object signal error vector $O_{Err}$ is a scaled difference between the new image estimate signal vector $I_{Est\text{-}new}$ and the previous image estimate signal vector $I_{Est}$ (i.e. $I_{Est\text{-}new} - I_{Est}$).

The scaling vector k scales the difference between the new image estimate signal vector $I_{Est\text{-}new}$ and the previous image estimate signal vector $I_{Est}$. The scaling vector k compensates for errors in the image signal to the object signal conversion.

Figure 7:
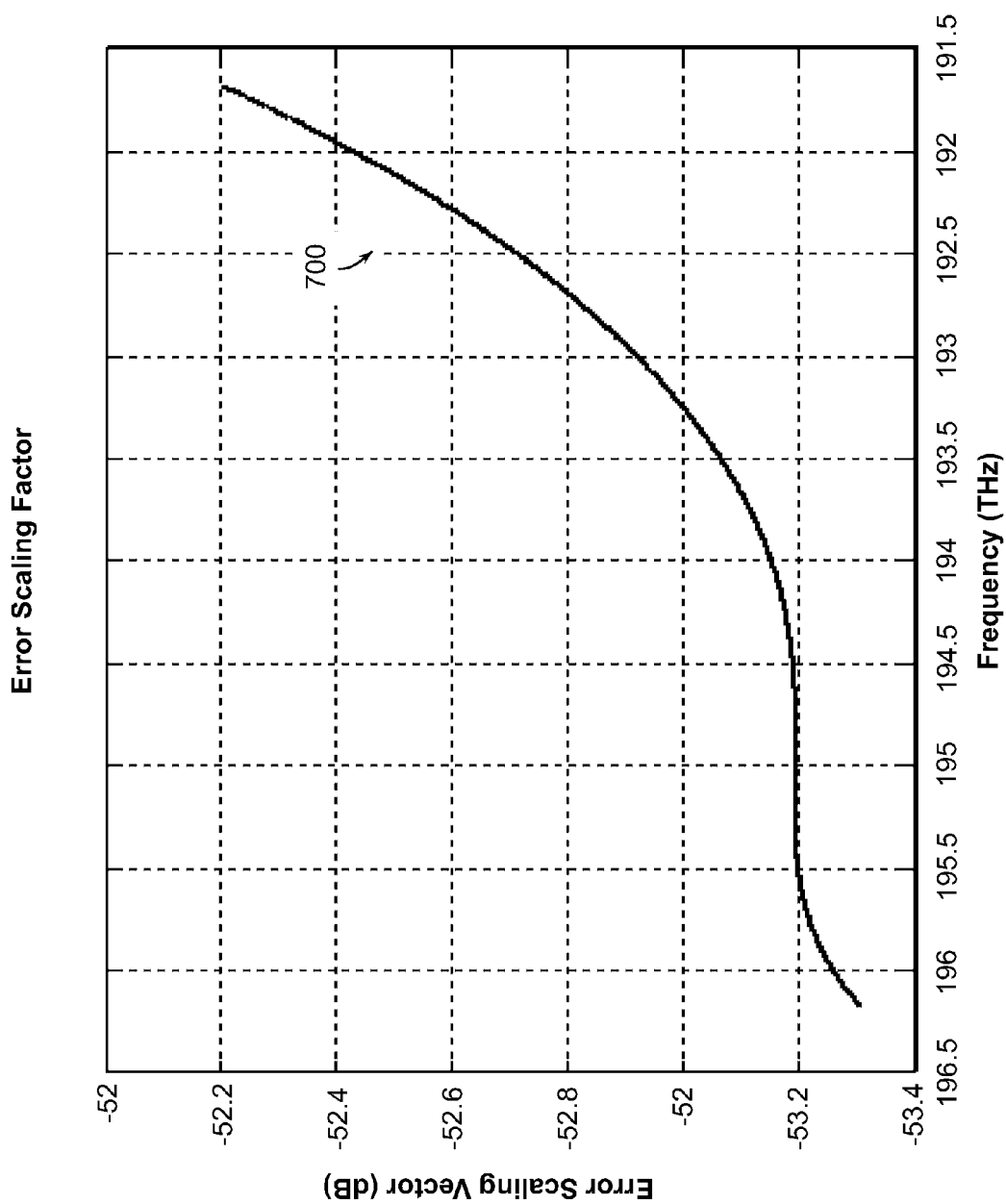
FIG. 7 illustrates a sample error scaling vector k that scales the image error vector to create an equivalent object error vector.

The scaling vector k is chosen to relate the number of counts generated by the analog-to-digital converter in the processor 110 to the power passing through the tunable optical filter 106. In addition, the scaling vector k is a function of the particular tunable optical filter 106 characteristics. The particular values of the scaling vector k depend upon several factors, such as the insertion loss of the tunable optical filter 106. FIG. 7 illustrates a sample error scaling vector k 700 that scales the image error vector to create an equivalent object error vector. An equation for calculating the object signal error vector $O_{Err}$ can be expressed as follows:

$$O_{Err}=k(I_{Est-new}-I) \text{ for the first iteration; and}$$

$$O_{Err}=k(I_{Est-new}-I_{Est}) \text{ for all other iterations.}$$

The fifth step 210 of the method is to calculate a new object estimate signal $O_{Est-new}$ signal vector from the most recent object estimate signal vector $O_{Est}$ and from the object signal error vector $O_{Err}$. The new object estimate signal vector $O_{Est-new}$ is a more accurate estimate of the object signal, which is the unknown optical channel signal, assuming that the algorithm of method 200 is converging. The new object signal estimate vector $O_{Est}$ 402' calculated in the method 200 is shown as a solid line in FIG. 4. An equation for calculating the new object estimate signal $O_{Est-new}$ can be expressed as follows:

$$O_{Est-new}=O_{Est}-O_{Err}$$

In some methods according to the present teaching, individual channels are identified by comparing the peaks in the spectrum of the new object estimate signal $O_{Est-new}$. Also, in some methods according to the present teaching, signals with different modulation formats are identified by their spectral shape and spectral width. Also, in some methods according to the present teaching, signals with different bit rates are identified by their spectral shape and spectral width.

The sixth step 212 of the method 200 is to repeat the method 200 from the third step 206 starting from a calculation of a new image estimate signal $I_{Est-new}$, which is a more accurate estimate of the unknown optical channel signal assuming that the algorithm of the method 200 is converging. The new image estimate signal vector $I_{Est-new}$ is calculated from the convolution of the most recent object signal estimate vector $O_{Est}$, which was determined in the fifth step 210, and the known filter response or spreading function S.

The method 200 then repeats the fourth step 208 that calculates the new object signal error vector $O_{Err}$. The new object signal error vector $O_{Err}$ is a scaled difference between the two most recently calculated image signal estimates. At this point in the method 200, the new object signal error vector $O_{Err}$ is a scaled difference between the new image estimate signal vector $I_{Est-new}$ and the previous estimate signal vector $I_{Est}$. The new object estimate signal vector $O_{Est-new}$ is then determined in the fifth step 210 from the difference between the most recent object estimate signal vector $O_{Est}$ and the new object signal error vector $O_{Err}$ determined in the fourth step 208. The new object estimate signal vector $O_{Est-new}$ is an even more accurate estimate of the object signal assuming that the algorithm is converging. Therefore, the new object estimate signal $O_{Est-new}$ vector is a more accurate representation of the unknown optical channel signal.

In various methods according to the present teachings, the method 200 is repeated from the third step 206 starting by calculating a new image estimate signal $I_{Est-new}$ fixed or variable number of times that has been determined to achieve a desired accuracy of object signal optical power or bit rate and/or certainty in signal identification. In other methods according to the present teachings, the method 200 is repeated from the third step 206 any number of times in order to obtain an estimate of the object signal power, bit rate, and/or signal identification that reaches a predetermined stability criteria. In current state-of-the art optical communications systems, the processor 110 can repeat the method 200 to the desired accuracy or stability criteria in the time required to obtain network management information without losing payload data.

Figure 8:
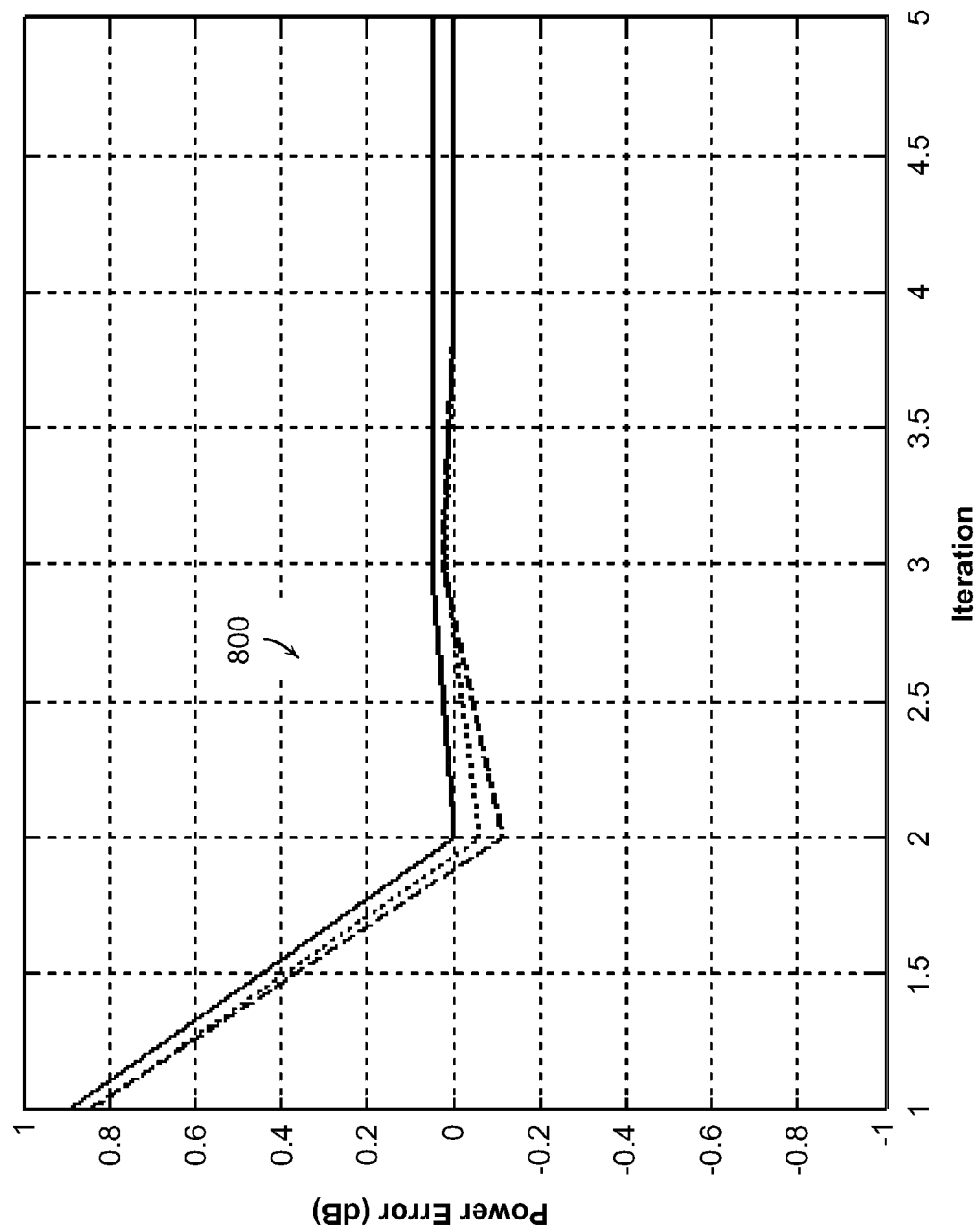
FIG. 8 illustrates a plot of OCM channel power error as a function of the number of power estimation algorithm iterations.

FIG. 8 illustrates a plot 800 of OCM channel power error in dB as a function of the number of power estimation algorithm iterations. The plot 800 indicates that the power error in dB rapidly decreases after only the second iteration. One feature of the methods and apparatus of the present teachings is that the requirements of the tunable optical filter 106 are greatly reduced because an accurate estimate of the full channel power of the optical channels, bit rate, and an identification of individual signals can be achieved quickly.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the teaching.

What is claimed is:

1. A method of monitoring optical power in an optical channel, the method comprising:
   a) directing a portion of a broadband optical signal propagating through an optical channel to an optical input of an electrically controllable tunable optical filter having a response function;
   b) filtering the portion of the broadband optical signal with the electrically controllable tunable filter to select an optical channel for optical power monitoring, a bandwidth of the electrically controllable tunable optical filter being broadband;
   c) detecting the selected optical channel and generating an electrical signal that represents the selected optical channel;
   d) estimating an optical power of the selected optical channel from the electrical signal that represents the selected optical channel by performing an iterative deconvolution of optical peak powers of the selected optical channel signals with the response function of the electrically controllable tunable optical filter; and
   e) identifying a signal bit rate of the selected optical channel from the electrical signal that represents the selected optical channel by performing an iterative deconvolution of optical peak powers of the selected optical channel signals with the response function of the electrically controllable tunable optical filter.

2. The method of claim 1 wherein the filtering the portion of the broadband optical signal with the electrically controllable tunable filter comprises adjusting a temperature of an electrically controllable thermally tunable optical filter.

3. The method of claim 1 further comprising identifying individual signals from the deconvolution.

4. The method of claim 1 further comprising applying an electrical control signal to the tunable optical filter that selects a desired passband of the tunable optical filter for selecting a desired optical channel.

5. A method of monitoring optical power in an optical channel, the method comprising:
   a) splitting a portion of a broadband optical signal propagating through an optical channel;
   b) filtering the portion of the broadband optical signal with a filter having a response function S to generate an unknown optical channel signal;
   c) measuring an image signal vector I corresponding to the unknown optical channel signal;
   d) calculating an initial object signal estimate vector $O_{Est\text{-}initial}$ corresponding to a first estimate of the unknown optical channel signal by convolving the initial image signal vector I with an inverse of the filter response $S^{-1}$;
   e) calculating a new image estimate signal vector $I_{Est\text{-}new}$;
   f) calculating an object signal error vector $O_{Err}$; and
   g) calculating a new object estimate signal vector $O_{Est\text{-}new}$ from the most recent object estimate signal vector $O_{Est}$ and from the object signal error vector $O_{Err}$.

6. The method of claim 5 further comprising repeating steps e) through g).

7. The method of claim 5 wherein the steps e) through g) are repeated until a desired accuracy of object signal optical power measurement is achieved.

8. The method of claim 5 wherein the steps e) through g) are repeated until a desired certainty of object signal identification is achieved.

9. The method of claim 5 wherein the steps e) through g) are repeated until a predetermined stability criteria is achieved.

10. The method of claim 5 further comprising calculating an inverse of the filter response $S^{-1}$ from the filter response S to a resolution.

11. The method of claim 5 further comprising scaling the object signal estimate vector $O_{Est}$ by a scaling function that scales a magnitude of the object signal estimate vector $O_{Est}$ as a function of frequency to more closely match an actual broadband optical signal propagating through the optical channel.

12. The method of claim 5 wherein the new image estimate signal vector $I_{Est\text{-}new}$ is calculated by convolving the initial object signal estimate vector $O_{Est\text{-}initial}$ with the response S of the tunable optical filter.

13. The method of claim 5 wherein the object signal error vector $O_{Err}$ is calculated by scaling a difference between two most recently calculated image signal estimates.

14. The method of claim 13 wherein the difference between the two most recently calculated image signal estimates is scaled by a scaling vector k that compensates for errors in an image signal to object signal conversion.

15. The method of claim 14 wherein the scaling vector k is chosen to relate a number of counts generated by an analog-to-digital converter to power passing through the tunable optical filter.

16. The method of claim 14 wherein the scaling vector k is a function of an insertion loss of the tunable optical filter.

17. The method of claim 5 wherein the calculating the new image estimate signal $I_{Est\text{-}new}$ comprises performing a convolution of the initial object signal estimate vector $O_{Est\text{-}initial}$ and the response of the tunable optical filter.

18. The method of claim 5 wherein the calculating the object signal error vector $O_{Err}$ comprises scaling a difference between the new image estimate signal vector $I_{Est\text{-}new}$ and a previous image estimate signal vector $I_{Est}$ (i.e. $I_{Est\text{-}new} - I_{Est}$) with a scaling vector k.

19. The method of claim 18 wherein the scaling vector k compensates for errors in an image signal to object signal conversion.

20. The method of claim 18 wherein the scaling vector k is chosen to relate a number of counts generated by an analog-to-digital converter to a power passing through the tunable optical filter.

21. The method of claim 18 wherein the scaling vector k is a function of an insertion loss of the tunable optical filter.

22. An optical channel monitor comprising:
   a) an optical tap that is optically coupled to an optical channel, the optical tap coupling a portion of a broadband optical signal propagating through the optical channel to an output;
   b) an electrically controllable tunable optical filter having a response function and an optical input that is coupled to the output of the optical tap, the electrically controllable tunable optical filter filtering the portion of the broadband optical signal to select an optical channel for optical power monitoring, a bandwidth of the electrically controllable tunable optical filter being broadband;
   c) an optical detector having an input that is positioned to detect the selected optical channel, the optical detector generating an electrical signal that represents the selected optical channel; and
   d) a processor that estimates an optical power and a signal bit rate of the selected optical channel from the electrical signal that represents the selected optical channel by performing an iterative deconvolution of optical peak powers of the selected optical channel signals with the response function of the electrically controllable tunable optical filter.

23. The optical channel monitor of claim 22 wherein the electrically controllable tunable optical filter comprises a thermally tunable optical filter.

* * * * *